United States Patent [19]
Rickter

[11] 3,929,786
[45] Dec. 30, 1975

[54] S-SUBSTITUTED HYDROPYRIMIDINE COMPOUNDS

[75] Inventor: Donald O. Rickter, Arlington, Mass.

[73] Assignee: Polaroid Corporation, Cambridge, Mass.

[22] Filed: Oct. 1, 1973

[21] Appl. No.: 402,130

Related U.S. Application Data

[63] Continuation-in-part of Ser. No. 214,665, Jan. 3, 1972, Pat. No. 3,785,813.

[52] U.S. Cl.... 260/251 A; 260/256.5 R; 260/251 R; 96/3; 96/29; 96/66.3; 96/76; 96/77
[51] Int. Cl.²......C07D 239/70; C07D 239/78; G03C 1/40; G03C 1/48
[58] Field of Search.................. 260/251 A, 256.5 R

[56] References Cited
UNITED STATES PATENTS 3,615,621 10/1971 Lamon........................ 260/251 A X
3,772,230 11/1973 Hardtmann..................... 260/251 A

FOREIGN PATENTS OR APPLICATIONS 707,495 12/1966 Belgium

OTHER PUBLICATIONS

Taylor et al., Angew, Chem. Internat. Edit., Vol. 5, No. 3 (1966) pp. 308–309.

Primary Examiner—Donald G. Daus
Assistant Examiner—Diana G. Rivers
Attorney, Agent, or Firm—Philip G. Kiely; Mart C. Matthews

[57] ABSTRACT

Novel polycyclic S-substituted hydropyrimidine compounds are provided having the general formula:

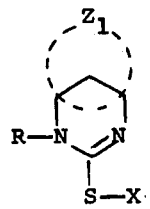

or 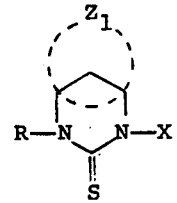

wherein $Z_1$ represents one or more 5 to 6 member alicyclic or heterocyclic fused rings; R is hydrogen or a carbon atom which is included in $Z_1$; and X is hydrogen or a group replaceable by hydrogen in an hydrolysis reaction with an aqueous alkaline solution. These compounds are useful as development restrainers, particularly in dye developer diffusion transfer photographic processes.

5 Claims, No Drawings

S-SUBSTITUTED HYDROPYRIMIDINE COMPOUNDS

CROSS REFERENCE TO RELATED APPLICATION

This application is a continuation-in-part of my copending application Ser. No. 214,665, filed Jan. 3, 1972, now U.S. Pat. No. 3,785,813.

BACKGROUND OF THE INVENTION

1. Field of the Invention

This invention relates to chemistry and, more particularly, to novel polycyclic sulfur-substituted hydropyrimidine compounds.

2. Description of the Prior Art

There are several references in the art to polycyclic sulfur-substituted hydropyrimidine compounds having at least one aromatic hydrocarbon ring system, e.g., a benzo group, fused to the hydropyrimidine nucleus. See, for example, Belgium Pat. No. 707,945; Chem. Abstracts, 70 42844d, Chem. Abstracts, 56 5964; J. Pharm. Sci. 50 886 (1961); Chem. Abstracts, 75 146231; German OLS 2,003,414; Z. Chem. 12, 289 (1972); and U.S. Pat. No. 3,615,549. The compounds of the present invention, however, are characterized as having either an alicyclic or heterocyclic ring system fused to the hydropyrimidine nucleus, and are therefore distinguished from the above-mentioned compounds.

Several commonly assigned copending applications for patent disclose the use of the class of photographic reagents embracing the compounds of the present invention. Copending application Ser. No. 349,063, filed Apr. 9, 1973 in the name of Stanley M. Bloom et al (and its parent application Ser. No. 210,650, filed Dec. 22, 1971 and now abandoned) discloses a class of hydropyrimidine compounds generic to the present compounds as being useful development restrainers in dye developer diffusion transfer photographic color processes. My copending application Ser. No. 214,665, filed Jan. 3, 1972, discloses that species of the lastmentioned compounds wherein a ring system of one or more rings is fused to the hydropyrimidine nucleus exhibit significantly greater photographic activity, i.e., development restraint, in such diffusion transfer photographic color processes. My U.S. Pat. No. 3,756,825, issued Sept. 4, 1973, discloses the use of such compounds, including those of the present invention, as toners in black-and-white silver diffusion transfer processes.

SUMMARY OF THE INVENTION

The novel compounds of the present invention may be represented by the formula:

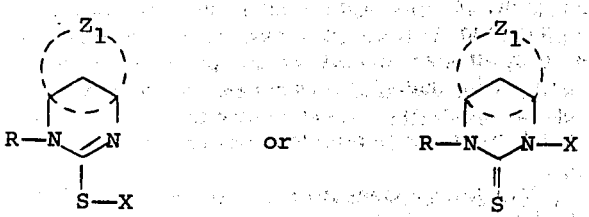

wherein $Z_1$ represents one or more 3 to 6 member alicyclic or heterocyclic rings in ortho-fused, ortho- and peri-fused, or bridged relationship with the hydropyrimidine nucleus; X is hydrogen or a group replaceable by hydrogen in an hydrolysis reaction with an aqueous alkaline solution; and R is hydrogen or a carbon atom of $Z_1$.

The method of preparation of the hydrolyzed compounds of this invention, i.e., when X is hydrogen, comprises reacting carbon disulfide with a cyclic diamine compound of the formula:

wherein $Z_1$ and R have the definitions given above. The hydrolyzable precursors, i.e., when X is an alkaline solution hydrolyzable group, are preferably prepared by reacting the hydrolyzed compound with a compound including said hydrolyzable group.

As described in more detail later, the compounds of the present invention may be advantageously employed as development restraining reagents in photographic diffusion transfer color processes utilizing dye developers.

DETAILED DESCRIPTION OF THE PREFERRED EMBODIMENTS

The novel compounds of this invention are represented by the following formulae:

wherein $Z_1$ is one or more fused alicyclic or heterocyclic rings, preferably containing from 3 to 6 atoms (when the atoms common to both the ring system and the hydropyrimidine group are included in the count), and most preferably $Z_1$ is a fused 5 or 6 carbon alicyclic ring system or a 5 or 6 member heterocyclic ring which includes a nitrogen atom of the hydropyrimidine nucleus; R is hydrogen or a carbon atom of $Z_1$; and X is hydrogen or a group replaceable by hydrogen in an hydrolysis reaction with an aqueous alkaline solution.

Alicyclic groups are univalent saturated hydrocarbon ring systems. Heterocyclic ring systems are those which contain one or more ring atoms other than carbon, in this instance, preferably nitrogen, and may be saturated or unsaturated. The prefix "hydro-" designates a heterocyclic ring system whose unsaturation is less than the one corresponding to the maximum number of noncumulative double bonds, e.g., hydropyrimidine denotes a pyrimidine group with one or two double bonds or with complete saturation.

All formulae set forth in this application are intended only to be illustrative of one form of the actual structure of the depicted compound. The "thiourea" grouping contained within the structural formulae of the compounds of the present invention are believed to undergo tautomeric rearrangements and therefore may actually exist in a variety of structures, the extremes of which may be represented, for example, by the formulae:

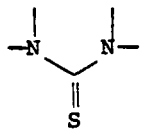 and 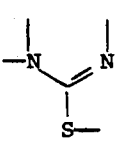

It is to be understood, therefore, that all such formulae contained in this specification and the appended claims represent the depicted structure and any tautomeric equivalent thereof.

The ring system attached to the hydropyrimidine nucleus may be either monocyclic or polycyclic and the ring or rings which constitute said system may have various alternative sites of attachment to the base hydropyrimidine nucleus. This position relationship between the above-mentioned ring system and the hydropyrimidine nucleus is described herein as "orthofused", "ortho- and peri-fused" or "bridged." See IUPAC 1957 rules; and Handbook of Chemistry and Physics; The Chemical Rubber Co.; 52nd Ed. (1971), pp. C-13 and C-18.

Polycyclic compounds in which two rings have two, and only two atoms in common are referred to as ortho-fused. Such compounds have n common faces and 2n common atoms. As examples of compounds having ortho-fused ring systems within the scope of the present invention, mention may be made of the following:

I. 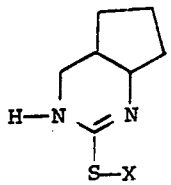

II. 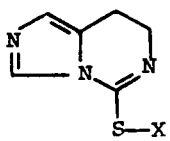

III. 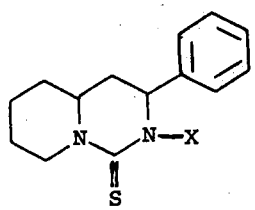

wherein X has the definition given above.

Polycyclic compounds in which one ring contains two, and only two, atoms in common with each of two or more rings of a contiguous series of rings are said to be ortho- and peri-fused. These compounds have n common faces and fewer than 2n common atoms. As an example of a compound contemplated by the present invention which has an ortho- and peri-fused ring system, mention may be made of:

IV. 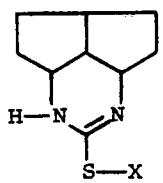

A bridge, as defined for the purposes of this application, is an atom or unbranched chain of atoms connecting two different non-adjacent atoms of the hydropyrimidine nucleus to form a closed ring. As an example of a compound having a bridged relationship of the fused ring system to the hydropyrimidine nucleus within the scope of the present invention, mention may be made of the following:

V. 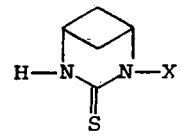

VI. 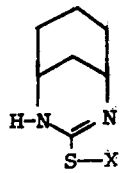

To further clarify the relationship of the ring systems of the hereindescribed compounds, the member atoms of the base hydropyrimidine nucleus may be numbered, for example:

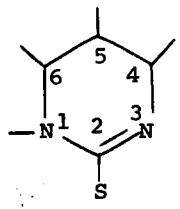

Accordingly, ortho-fused compounds as described above would include, for example, those compounds having ring systems attached to atoms 4 and 5, 5 and 6 and 1 and 6 of the hydropyrimidine nucleus. Similarly, the above-described bridged compounds would include those compounds having, for example, 4, 6-; 1, 5- and 1, 4- ring attachment. Ortho- and peri-fused compounds would include, for example, compounds having contiguous attached ring systems in the 4, 5, 6- position and the 1, 6, 5 - position on the hydropyrimidine nucleus.

In preferable embodiments of the invention, $Z_1$ is a fused alicyclic ring system having from 3 to 6 carbon atoms, or a fused heterocyclic ring system having 3 to 6 member atoms including a nitrogen atom of the hydropyrimidine nucleus. Most preferably, $Z_1$ is a 5- or 6-membered alicyclic ring system, e.g., a cyclopenta or cyclohexa group. It is understood that the member atoms of the fused cyclic group which are also members of the hydropyrimidine nucleus are included in determining the total number of members in the fused cyclic group as defined above.

R, as defined above, may be hydrogen or a carbon atom which is a part of the ring system depicted as $Z_1$. When R is so defined, a ring which is included in $Z_1$ may also have as a member atom one of the nitrogens of the hydropyrimidine nucleus. Compounds II and II depicted above are examples of this type of compound wherein an ortho-fused heterocyclic ring shares a nitrogen atom with the hydropyrimidine nucleus.

As described hereinabove, X may be hydrogen, in which case the compound represented by the above formula is in its hydrolyzed form, or X may be a group replaceable by hydrogen in an hydrolysis reaction with an aqueous alkaline solution, in which case the compound is referred to as a hydrolyzable precursor.

It has been previously mentioned that the principle utility of the compounds of the present invention resides in the photographic art and they are particularly useful as development restraining reagents in diffusion transfer color processes employing aqueous alkaline processing compositions. For a detailed discussion of processes and products employing the compounds of the present invention, reference should be made to the aforementioned copending application Ser. No. 214,665, filed Jan. 3, 1972 and the aforementioned U.S. Pat. No. 3,756,825, issued Sept. 4, 1973.

Various diffusion transfer systems for forming color images have heretofore been disclosed in the art and need not be described in detail in this application. Generally speaking, such systems rely for color image formation upon a differential in mobility or solubility of a dye image-providing material obtained as a function of development of exposed silver halide so as to provide an imagewise distribution of such material which is more diffusible and which is therefore selectively transferred, at least in part, by diffusion, to a superposed dyeable stratum to impart thereto the desired color transfer image. The differential in mobility or solubility may, for example, be obtained by a chemical action such as a redox reaction or a coupling reaction.

In any of these systems, multicolor images are obtained by employing a film unit containing at least two selectively sensitized silver halide emulsions each having associated therewith a dye image-providing material exhibiting desired spectral absorption characteristics. The most commonly employed element of this type is the so-called tripack structure employing a blue-, a green- and a red-sensitive silver halide layer having associated therewith, respectively, a yellow, a magenta and a cyan dye image-providing material.

A particularly useful system for forming color images by diffusion transfer is that described in U.S. Pat. No. 2,983,606, employing dye developers (dyes which are also silver halide developing agents) as the dye image-providing materials. In such systems, a photosensitive element comprising at least one silver halide layer having a dye developer associated therewith (in the same or in an adjacent layer) is developed by applying an aqueous alkaline processing composition. Exposed and developable silver halide is developed by the dye developer which in turn becomes oxidized to provide an oxidation product which is appreciably less diffusible than the unoxidized dye developer, thereby providing an imagewise distribution of diffusible dye developer in terms of unexposed areas of the silver halide layer, which imagewise distribution is then transferred, at least in part, by diffusion, to a dyeable stratum to impart thereto a positive dye transfer image. Multicolor images may be obtained with a photosensitive element having two or more selectively sensitized silver halide emulsions and associated dye developers, a tripack structure of the type described above and in various patents including the aforementioned U.S. Pat. No. 2,983,606 being especially suitable for accurate color recordation of the original subject matter.

A number of diffusion transfer photographic processes have been proposed wherein the resulting photograph comprises the developed silver halide emulsions retained with the dye-image carrying layer as part of a permanent laminate. The image-carrying layer is separated from the developed silver halide emulsions in said laminate by a light-reflecting layer, preferably a layer containing titanium dioxide. Illustrative of patents describing such products and processes are the aforementioned U.S. Pat. No. 2,983,606 issued Mar. 9, 1961 to Howard G. Rogers, U.S. Pat. Nos. 3,415,644, 3,415,645 and 3,415,646 issued Dec. 10, 1968 to Edwin H. Land, U.S. Pat. Nos. 3,594,164 and 3,594,165 issued July 20, 1971 to Howard G. Rogers, and U.S. Pat. No. 3,647,347 issued Mar. 7, 1972 to Edwin H. Land.

In the preferred embodiments of the above-mentioned processes employing multilayer negatives processed with an aqueous alkaline processing composition, unoxidized dye developer diffusion from an underlying emulsion to the superposed image-receiving layer must pass through at least one other overlying photosensitive silver halide emulsion. If the unoxidized dye developer diffusion from the underlying layer enters an area of the overlying emulsion containing developable silver halide, there is as much likelihood that the diffusing dye developer from the underlying emulsion will react as dye developer associated with said overlying emulsion will react. This reaction in the "wrong" silver halide emulsion may be referred to as "crosstalk" and manifests itself by producing transfer images having reduced color separation.

U.S. Pat. No. 3,265,498, issued Aug. 9, 1966, is directed to means for causing the developable silver halide remaining undeveloped after a predetermined time to be rendered undevelopable so that unoxidized dye developer diffusion through said emulsion layer will not be immobilized by development of the developable silver halide contained therein. This object is achieved by incorporating in a layer of either the photosensitive element or the image-receiving element or, in some instances, in the processing composition, a reagent which is made available to the developable silver halide of a given emulsion layer only after a predetermined period during which development is affected without interference by said reagent. Since the added reagent effectively restrains, i.e., minimizes, further development of a developable silver halide after this predetermined period, such reagents employed for this purpose are referred to as development restrainers.

U.S. Pat. No. 3,265,498 also teaches the employment of hydrolyzable development restrainers, i.e., development restrainer precursors which are substantially nondiffusible or at least substantially less diffusible in its unhydrolyzed form than in its hydrolyzed form and wherein the development restrainer function is substantially unavailable in said unhydrolyzed form. Thus, development restrainers are made available at a predetermined period by hydrolysis of a suitable derivative of the development restrainer. Such hydrolysis of the hydrolyzable development restrainer after predetermined induction period thus serves an effective way of controlling the availability of the development restrainer and insuring that the development is carried out unimpeded by a development restrainer for at least a time sufficient to develop the exposed and developable silver halide to the minimum extent necessary to properly modulate the appropriate dye developer.

The alkaline solution hydrolyzable group represented by X may comprise a group which would be removed and replaced by hydrogen by the action of the alkaline processing composition as a function of temperature. For example, X may comprise a group of the formula:

wherein $R^1$ is aryl or alkyl. The length of the alkyl group or substituent on the aryl group is selected by the operator to provide the desired rate of solubility in alkaline processing composition and thus provide the desired rate of diffusion or mobility of the compound from its initial location in the film unit to other locations in the film unit where it can then be hydrolyzed at a temperature dependent rate to provide the development restrainer function. Alternatively, depending upon the selection of the specific substituents, the sequence and degree of diffusion and hydrolysis can be controlled and the locus of hydrolysis determined. Thus, the compounds of the present invention can diffuse in the inactive form to the desired locus in the film unit to help minimize a concentration gradient and avoid excess concentration of restrainer in particular locations. Typically, the length of an alkyl chain represented by $R^1$ may be from 1 to 20 carbon atoms, whereas typical substituents on the aryl group represented by $R^1$ may be substituted or unsubstituted hydroxyl or amino groups.

X may also comprise, for example, a group of the formula:

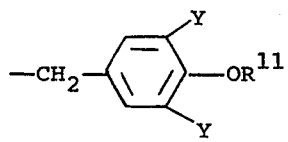

wherein Y is hydrogen, alkyl or halide, and $R^{11}$ is hydrogen or acyl, e.g., acetyl, propionyl, etc. Hydrolyzable groups of the above type are described further in, for example, U.S. Pat. No. 3,698,898.

As examples of suitable alkaline hydrolyzable groups contemplated by X, mention may be made of the following:

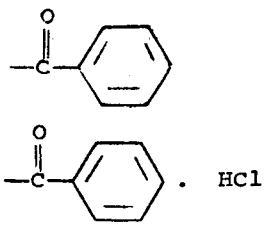

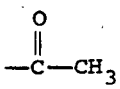

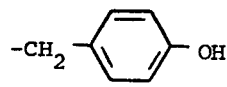

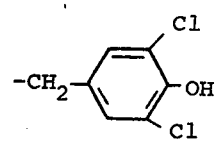

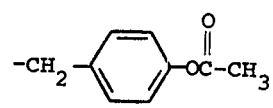

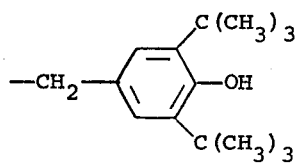

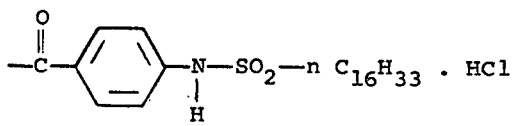

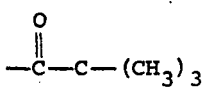

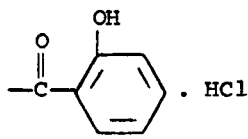

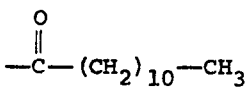

The compounds of the present invention may be prepared by reacting carbon disulfide with a cyclic diamine compound of the formula:

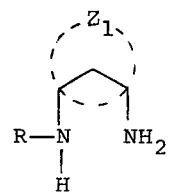

wherein $Z_1$ and R have the definitions previously given. Both reactants in the above preparation are known compounds which are commercially available or which can be readily prepared by known methods. For further reference, see Org. Synth., Coll. Vol. III, 395. It should be noted that toxic hydrogen sulfide is evolved during the course of the preparation and should be contained, for example, by trapping in an aqueous lead acetate solution. The preparation of compounds of the present invention will be further illustrated by the following examples which are not intended to limit the scope of the invention to the details set forth therein:

EXAMPLE I

One mole of 2-aminomethyl cyclopentyl amine (114 g., or approx. 120 ml. of the amine available from BASF) was dissolved in one liter of ethanol. About 120 ml. of carbon disulfide was then added to this solution over a period of ½ hour. This mixture was refluxed overnight in a hood, and then refluxed for another 1 to 5 hours with 10 ml. of concentrated hydrochloric acid added to ensure that any dithiocarbamate present was completely ringclosed. (Each fraction may be tested with aqueous cupric sulfate. There should be no brown color observed).

The solid formed was filtered from the hot reaction mixture. This product was determined to be the crude trans isomer of 4,5-cyclopentahexahydropyrimidine-2-thione having a melting point of approximately 200°-220° C. Other crops collected after cooling melted at approximately 180°-200° C. This trans isomer may be represented by the formula:

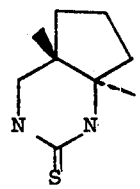

trans 4,5-cyclopentahexahydropyrimidine-2-thione
Evaporation of the filtrate gave the crude cis isomer of 4,5-cyclopentahexahydropyrimidine-2-thione and may be represented by the formula:

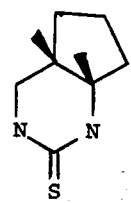

cis 4,5-cyclopentahexahydropyrimidine-2-thione

Although the crude isomers or mixtures thereof were satisfactory for the preparation of various derivatives for photographic use, several recrystallizations from alcohol gave the pure compounds which had the following properties:

| Isomer | M.P. | Color and State | U.V.-Vis Spec (3A ethanol) λ Max | ε(molar extinction coefficient) |
|---|---|---|---|---|
| Cis | 165–7°C. | white crystals | 243 mµ | 14,600 |
| Trans | 236–8°C. | white crystals | 247 mµ | 14,400 |
| Equimolar mixture of isomers | 150–220°C. | white crystals | 245 mµ | 14,400 |

Elemental analysis of the trans isomer gave:

| | weight/weight percentage | | | |
|---|---|---|---|---|
| | C | H | N | S |
| Found | 53.8% | 8.0% | 17.7% | 20.2% |
| Theoretical | 53.81% | 7.75% | 17.92% | 20.52% |

EXAMPLE II

First, 12 ml of $CS_2$ was added over a period of 5 minutes to about 200 ml of a 2B ethanolic solution containing 11.4 g (0.10 mole) of 1,3-diaminocyclohexane (available from Farbenfabriken Bayer AG). There was an instantaneous reaction to form a white solid. Another 100 ml of 2B ethanol was added and the mixture refluxed for an hour. Since the mixture produced a positive test with $Cu^{++}$ indicating the presence of unclosed dithiocarbamate, 200 ml of ethanol and 5 ml of concentrated HCl were added and the mixture refluxed for another 2 ½ hours. The white crystalline solid produced was filtered from the reaction mixture and evaporated to give a crude product which had a melting point of 281°–286° C. This material was recrystallized from acetone to give a product with essentially the same melting point, and a U.V. visible spectrum in 3A ethanol exhibiting a λmax of 243 mµ and molar extinction coefficient of 14,800. The product may be represented by the formula:

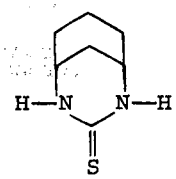

4,6-(cyclohexa)hexahydropyrimidine-2-thione

EXAMPLE III

About 2.9g (0.026 mole) of histamine (Eastman Kodak No. 3404) was dissolved in 50 ml of alcohol 2B. Then, 5 g of $CS_2$ (4 ml at 1.26 g/ml) was added to the boiling solution. After about 1 hour of reflux, the clear yellow solution was poured into a beaker and chilled in ice. A pale yellow solid product was produced and filtered from the reaction mixture. The dried product had a melting point of 219°–221° C. An elemental analysis was consistent with the structure of imidazo [1,5-c] hexahydropyrimidine-2'-thione, as detailed below:

|  | weight/weight percentage | | | |
|---|---|---|---|---|
|  | C | H | N | S |
| Found: | 47.4% | 4.6% | 27.4% | 20.6% |
| Theoretical: | 47.04% | 4.61% | 27.42% | 20.93% |

The product may be represented by the formula:

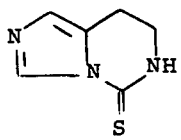

imidazo [1,5-c] hexahydropyrimidine-2'-thione

Those compounds in which the position designated as X in the formulae depicted above is a group which is replaceable by hydrogen in an hydrolysis reaction with alkaline processing composition, i.e., development restrainer precursors, are preferably prepared by employing, for example, the method described above to form the active development restrainer, and then including an additional step which comprises reacting the product of this method with a compound providing the hydrolyzable group. Typical reactions of this type are illustrated by the following non-limiting examples:

|  | weight/weight percentage | | | | |
|---|---|---|---|---|---|
|  | C | H | N | Cl | S | O |
| Theoretical: | 45.73 | 4.66 | 7.62 | 28.92 | 8.71 | 4.35 |
| Found: | 45.90 | 4.24 | 7.38 | 29.40 | 8.82 | (4.26) |

The resultant product, 2-(3',5'-dichloro-4'-hydroxybenzylmercapto)-trans-4,5-cyclopenta-3,4,5,6-tetrahydropyrimidine hydrochloride, illustrates the "salt" form of the development restrainer precursors of the present invention which may occur when the X moiety is attached to the S atom. The counterion molecule is weakly held to the development restrainer precursor molecule by electrical attractive forces and may be readily removed or changed as illustrated by the following example:

EXAMPLE V

About 67 mg (0.18 millimole) of the product of Example IV was dissolved with stirring in about 10 ml of distilled water and the solution filtered. Then, 7.9 mg (0.23 millimole) of sodium tetraphenylborate (Matheson, Coleman and Bell SX805) was dissolved in 2 ml of distilled water and was filtered into the first solution. A white precipitate formed at once producing a milky mixture. The white precipitate obtained after filtering and air drying had a melting point of about 75° C. An elemental analysis gave the following results:

|  | weight/weight percentage | | | | | | |
|---|---|---|---|---|---|---|---|
|  | C | H | N | Cl | S | O | B |
| Theoretical: | 70.06 | 5.73 | 4.30 | 10.88 | 4.91 | 2.46 | 1.66 |
| Found: | 69.77 | 5.77 | 4.37 | 10.92 | 4.74 | — | 1.76 |

EXAMPLE IV

The product may be represented by the formula:

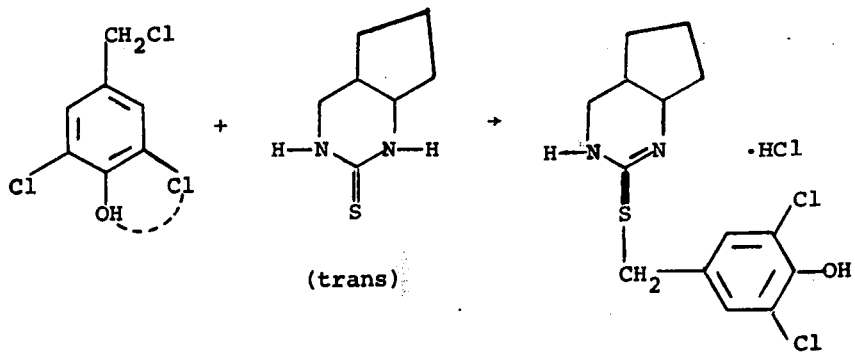

About 1.1 g of 3,5-dichloro-4-hydroxybenzylchloride (0.005 mole) and 0.78 g of trans 4,5-cyclopentahexahydropyrimidine-2-thione (0.005 mole) were put in a flask and 25 ml reagent grade acetone was added thereto. A white solid formed. The mixture was shaken occasionally and then left to sit overnight at room temperature. The white solid product was then removed by filtration and dried in a vacuum oven at room temperature. The product had a melting point of 229°–233° C. and gave the following elemental analysis:

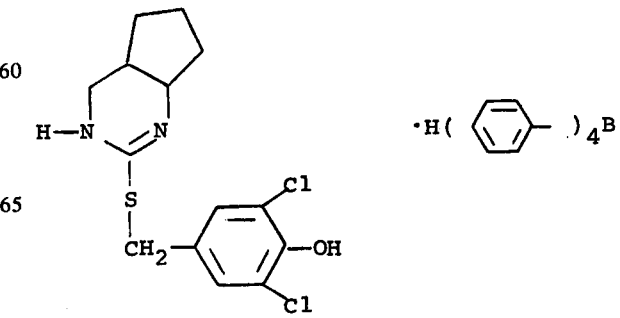

2-(3',5'-dichloro-4'-hydroxybenzylmercapto)-trans-4,5-cyclopenta-3,4,5,6-tetrahydropyrimidine tetraphenyl borate.

The following example illustrates the preparation of a development restrainer precursor wherein the X moiety is attached to a nitrogen of the hydropyrimidine group:

EXAMPLE VI

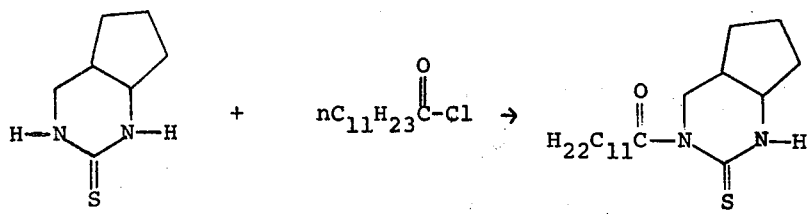

To a solution of 6.25 g (0.040 mole) of 4,5-cyclopentahexahydropyrimidine-2-thione and 4.0 g (0.040 mole) of triethylamine (Eastman Kodak No. 616) in 100 ml of AR chloroform, 8.75 g (0.040 mole) of lauroyl chloride (Eastman Kodak No. 2217) in 25 ml of chloroform was added dropwise with continual stirring. The stirring was then continued for about 2 ½ hours after the addition was completed. The product was then washed, separated from the reaction mixture, recrystallized from alcohol and dried. The white solid melted at 93°–97° C. and gave the following elemental analysis:

|  | C | H | N | S | O |
|---|---|---|---|---|---|
| Theoretical: | 67.41 | 10.12 | 8.27 | 9.47 | 4.73 |
| Found: | 67.60 | 10.16 | 8.22 | 9.55 | (4.47) |

Adding the alkaline hydrolyzable group to the development restrainer in its active form by other methods will be obvious to those skilled in the art.

Since certain changes may be made in the above compounds and processes without departing from the scope of the invention herein involved, it is intended that all matter contained in the above description or in the examples shall be interpreted as illustrative and not in a limiting sense.

What is claimed is:

1. A compound having the formula:

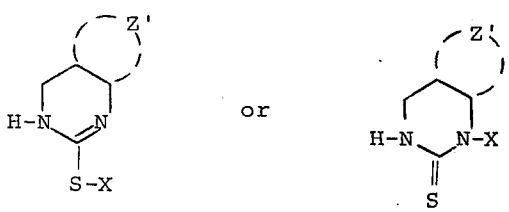

wherein Z' is an ortho-fused cyclopenta or cyclohexa group; X is hydrogen or an alkaline hydrolyzable group represented by the formula:

wherein R' is an alkyl group having from 1 to 20 carbon atoms; phenyl; p-hydroxyphenyl or o-hydroxyphenyl; or by the formula:

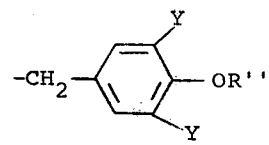

wherein Y is hydrogen, t-butyl or chloro, and R'' is hydrogen, acetyl or propionyl.

2. A compound as defined in claim 1 having the formula:

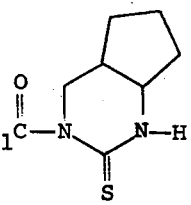

including cis and trans isomers and mixtures thereof.

3.

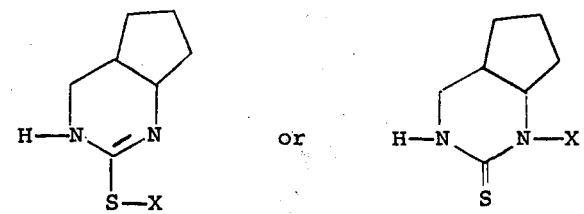

4.

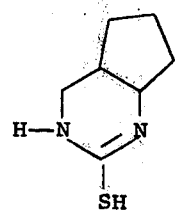

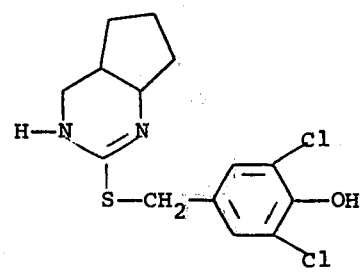

5.

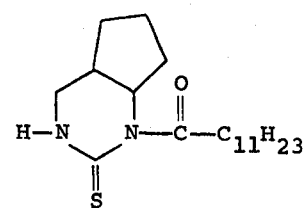

* * * * *